US010030989B2

(12) United States Patent
Matsui et al.

(10) Patent No.: US 10,030,989 B2
(45) Date of Patent: Jul. 24, 2018

(54) REPORTING APPARATUS

(71) Applicant: DENSO CORPORATION, Kariya, Aichi-pref. (JP)

(72) Inventors: Kazuhiro Matsui, Kariya (JP); Takahira Kato, Kariya (JP); Takamitsu Suzuki, Kariya (JP); Yuko Nakamura, Kariya (JP); Takeshi Yamamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 6 days.

(21) Appl. No.: 15/121,304

(22) PCT Filed: Mar. 5, 2015

(86) PCT No.: PCT/JP2015/001160
§ 371 (c)(1),
(2) Date: Aug. 24, 2016

(87) PCT Pub. No.: WO2015/133142
PCT Pub. Date: Sep. 11, 2015

(65) Prior Publication Data
US 2017/0016739 A1    Jan. 19, 2017

(30) Foreign Application Priority Data

Mar. 6, 2014  (JP) ................. 2014-044248

(51) Int. Cl.
*G01C 21/36*     (2006.01)
*G06F 17/30*     (2006.01)
(Continued)

(52) U.S. Cl.
CPC .......... *G01C 21/3629* (2013.01); *B60K 37/00* (2013.01); *G01C 21/3608* (2013.01);
(Continued)

(58) Field of Classification Search
CPC ............ G01C 21/3629; G01C 21/3608; G08G 1/096775; G06F 17/30241
See application file for complete search history.

(56) References Cited

U.S. PATENT DOCUMENTS

2003/0130016 A1 * 7/2003 Matsuura ............... H04R 5/033
                                                       455/569.1
2005/0075875 A1 * 4/2005 Shozakai ........... G06K 9/00335
                                                       704/231
(Continued)

FOREIGN PATENT DOCUMENTS

JP    2001141498 A    5/2001
JP    2011179917 A    9/2011
JP    2013003887 A    1/2013

*Primary Examiner* — Tuan C To
(74) *Attorney, Agent, or Firm* — Harness, Dickey & Pierce, P.L.C.

(57) ABSTRACT

In a vehicle, positional information of the vehicle and status determination information are serially acquired. Each time a user speaks a speech, speech data is acquired. A storage section stores the acquired speech data, and the positional information and status determination information acquired when the speech data is acquired, in association in a memory, as stored speech data, stored positional information, and stored status determination information. For each stored speech data in the memory, a determination is made whether a first status indicated by the stored positional information and stored status determination information associated with the stored speech data is similar to a second status indicated by the positional information and status determination information newly acquired at a current time. A reporting processor reports, to a driver, information based on the stored speech data when the determination is affirmed.

13 Claims, 8 Drawing Sheets

(51) Int. Cl.
*G08G 1/0967* (2006.01)
*B60K 37/00* (2006.01)

(52) U.S. Cl.
CPC ... *G06F 17/30241* (2013.01); *G08G 1/09675* (2013.01); *G08G 1/096716* (2013.01); *G08G 1/096775* (2013.01); *G08G 1/096783* (2013.01)

(56) References Cited

U.S. PATENT DOCUMENTS

| | | | | |
|---|---|---|---|---|
| 2005/0131699 A1* | 6/2005 | Fukada | ................... | G10L 15/00 704/270 |
| 2005/0228645 A1* | 10/2005 | Nishimura | ........ | G06F 17/30026 704/201 |
| 2007/0271099 A1* | 11/2007 | Kagoshima | ........... | G10L 13/047 704/258 |
| 2010/0198591 A1* | 8/2010 | Yoshizawa | ............. | G06Q 10/00 704/231 |
| 2010/0211392 A1* | 8/2010 | Tokuda | ................... | G10L 13/00 704/260 |
| 2011/0119052 A1* | 5/2011 | Onodera | ............... | G10L 15/187 704/10 |
| 2012/0014568 A1* | 1/2012 | Conwell | ................. | G10L 15/07 382/118 |
| 2012/0323569 A1* | 12/2012 | Ohtani | ................. | G10L 13/033 704/206 |
| 2013/0339024 A1* | 12/2013 | Kojima | ................. | G08G 1/123 704/270.1 |
| 2014/0019137 A1* | 1/2014 | Kitagishi | ............. | G10L 13/043 704/260 |
| 2014/0181865 A1* | 6/2014 | Koganei | .......... | H04N 21/42203 725/38 |
| 2014/0207454 A1* | 7/2014 | Nakata | ................... | G10L 15/22 704/235 |
| 2015/0006167 A1* | 1/2015 | Kato | ....................... | G10L 15/22 704/231 |
| 2016/0240188 A1* | 8/2016 | Seto | ........................ | G10L 15/32 |

\* cited by examiner

FIG. 4

| SPEECH DATA | POSITION | TRAVEL DIRECTION | TIME | | WEATHER | | CONGESTION DEGREE | START POINT | DESTINATION | NO OF OCCUPANTS |
| --- | --- | --- | --- | --- | --- | --- | --- | --- | --- | --- |
| | | | CLOCK | DAY OF WEEK | TEMP | CONDITION | | | | |
| No. 1 | P1 | 5 | 8:05 | MON | 18°C | RAIN | NONE | HOME | COMPANY | 1 |
| No. 2 | P2 | 90 | 11:00 | SAT | 20°C | FINE | SLOW | HOME | FACILITY A | 4 |
| No. 3 | P3 | 180 | 18:00 | FRI | 1°C | SNOW | null | FACILITY B | null | 1 |
| ... | ... | ... | ... | ... | ... | ... | ... | ... | ... | ... |

FIG. 9

STATUS DETERMINATION INFORMATION

| SPEECH DATA | POSITION | TRAVEL DIRECTION | TIME | | NO OF OCCUPANTS | CLASSIFICATION |
|---|---|---|---|---|---|---|
| | | | CLOCK | DAY OF WEEK | | |
| No. 1 | P1 | 5 | 8:05 | MON | 1 | CONGESTION |
| No. 2 | P2 | 90 | 11:00 | SAT | 4 | ALERT |
| No. 3 | P3 | 180 | 18:00 | FRI | 1 | SUGGEST |
| ... | ... | ... | ... | ... | ... | ... |

REPORTING APPARATUS

CROSS REFERENCE TO RELATED APPLICATIONS

This application is a U.S. National Phase Application under 35 U.S.C. 371 of International Application No. PCT/JP2015/001160 filed on Mar. 5, 2015 and published in Japanese as WO 2015/133142 A1 on Sep. 11, 2015. ThisThe present application is based on and claims the benefit of priority from Japanese Patent Application No. 2014-044248 filed on Mar. 6, 2014. The entire disclosures of all of the above applications are incorporated herein by reference.

TECHNICAL FIELD

The present disclosure relates to a reporting apparatus in a vehicle.

BACKGROUND ART

There is an apparatus (i.e., reporting apparatus) such as a navigation apparatus disclosed in Patent Literature 1, which reports a variety of information to a driver via an audio output apparatus or a display.

Such a reporting apparatus of Patent Literature 1 includes a speech recognition apparatus, which is used for a driver to input by speech the information that is desired to be registered if encountering such information at a position during travel. The information registered includes (i) facilities such as convenience stores and coffee shops, and (ii) alerts to sudden rush-outs of children or falling/fallen rocks. When receiving the speech input, the reporting apparatus stores the input information (speech input information) in association with positional information and a travel direction at the time of the speech input.

When the positional information and travel direction stored in association with the speech input information match the current positional information and travel direction, the speech input information is reported to the driver via an audio output apparatus.

PRIOR ART LITERATURES

Patent Literature

Patent Literature 1: JP 2001-141498 A

SUMMARY OF INVENTION

The reporting apparatus of Patent Literature 1 reports the speech input information each time the current positional information and travel direction of a host vehicle mounting the apparatus match the positional information and travel direction of the registered speech input information. That is, each time the host vehicle travels on the associated road in the associated direction, the speech input information is reported to the driver.

The utility of the speech input information for the driver may however change depending on changes in time, weather, and the number of occupants even at the same location and in the same travel direction. For example, the speech input information indicating an alert to sudden rush-outs of children on a road near a primary school is useful in the morning and evening when children go to or leave school, but not useful in the daytime and night when children do not go out. This example indicates that the utility of the speech input information for the driver changes in response to time zone. The utility of the speech input information thus changes in response to status. When the speech input information is reproduced in each travel at the location associated with the speech input information in the travel direction associated with the speech input information, the reproduction may annoy the driver.

An object of the present disclosure is to provide a reporting apparatus that appropriately determines whether to report speech input information.

To achieve the object, according to an example of the present disclosure, a reporting apparatus used in a vehicle is provided to include the following. A positional-information acquisition section acquires positional information of the vehicle as a factor to determine a status. A status acquisition section acquires at least either external information indicating a status external to the vehicle or travel condition information about a factor likely to change in the vehicle at each travel, as status determination information. A speech data acquisition section acquires speech as speech data each time a user speaks the speech. A storage section associates the speech data with the positional information and the status determination information acquired at a time when the speech data is acquired by the speech data acquisition section, and stores the speech data, the positional information associated with the speech data, and the status determination information associated with the speech data, in a memory, as stored speech data, stored positional information, and stored status determination information. A similarity determination section determines with respect to each stored speech data in the memory whether a first status taking place at a time when the stored speech data is acquired is similar to a second status taking place at a current time. The first status is indicated by the stored positional information associated with the stored speech data and the stored status determination information associated with the stored speech data. The second status is indicated by the positional information newly acquired by the positional-information acquisition section at the current time and the status determination information newly acquired by the status acquisition section at the current time. A reporting processor reports, to a driver, information based on the stored speech data in cases that the similarity determination section determines that the first status taking place at the time when the stored speech data is acquired is similar to the second status at the current time.

In the above, a similarity determination section determines whether a status when acquiring each speech data stored in a memory is similar to a current status. A reporting processor reports, to a driver, the information based on the speech data determined to be acquired under a status similar to the current status.

Status determination information, which is used to determine whether the status when acquiring the speech data is similar to the current status, includes at least either (i) external information indicating a status external to a vehicle or (ii) travel condition information about factors that change inside the vehicle at each travel. The "travel" herein indicates a travel from the ignition-on to ignition-off. The travel direction is not included in the external information or travel condition information.

If the status determination information indicates that the current status is different even at the same location in the same travel direction, the similarity determination section determines that the status when acquiring the speech data associated with the same location is not similar to the current status. The reporting processor does not report the information based on the speech data to the driver. This enables appropriate determination whether to report the information based on speech data, i.e., speech input information.

BRIEF DESCRIPTION OF DRAWINGS

The above and other objects, features and advantages of the present disclosure will become more apparent from the following detailed description made with reference to the accompanying drawings. In the drawings:

FIG. 4 is a diagram illustrating an example of a data configuration of a speech data list stored in a memory;

FIG. 9 is a diagram illustrating an example of a data configuration of a speech data list stored in a memory in a second embodiment.

EMBODIMENTS FOR CARRYING OUT INVENTION

First Embodiment

Figure 1:
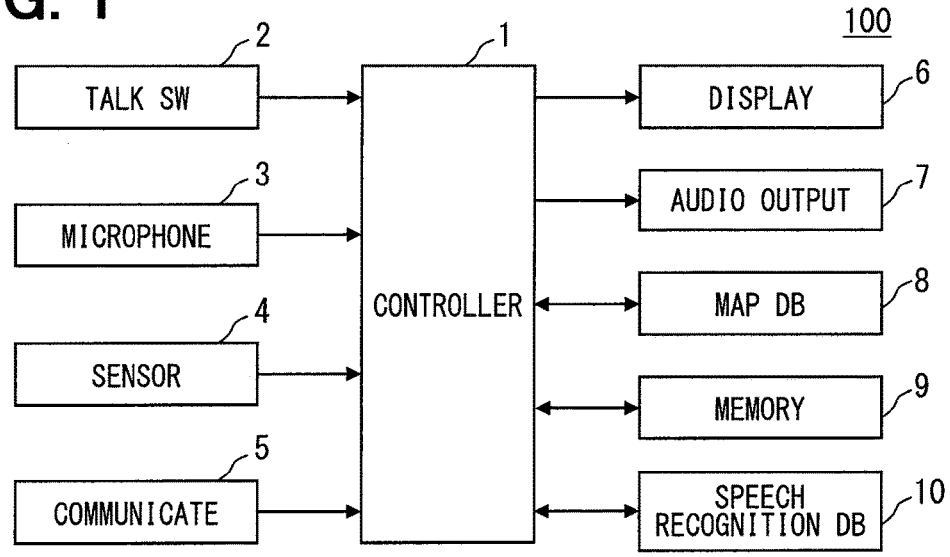
FIG. 1 is a block diagram illustrating an example of a schematic configuration of a reporting system of a first embodiment.

One example of embodiments of the present disclosure (first embodiment) is explained using the drawings. FIG. 1 illustrates an example of a schematic configuration of a reporting system 100 of the present embodiment. As in FIG. 1, the reporting system 100 includes a controller 1, talk switch (hereinafter, talk SW) 2, microphone 3, in-vehicle sensor group 4, communication apparatus 5, display 6, audio output apparatus 7, map DB 8, memory 9, and speech recognition DB 10. The DB in the map DB 8 and speech recognition DB 10 indicates a database.

The controller 1 communicates with the talk SW 2, microphone 3, in-vehicle sensor group 4, communication apparatus 5, display 6, audio output apparatus 7, map DB 8, memory 9, and speech recognition DB 10 via a well-known in-vehicle network. Hereinafter, the vehicle mounting the reporting system 100 is called a host vehicle.

The talk SW 2 instructs a user (driver) to start speech input, and is provided to a user-maneuverable position such as to a side surface of a steering column cover and near a shift lever. The talk SW 2 uses the so-called click switch as one example, and outputs an on signal to the controller 1 when clicked by the user. The controller 1 starts acquiring data of speech of the user (namely, speech data) when the on signal is inputted from the talk SW 2.

The microphone 3 is a small omnidirectional microphone that collects speech of the user and ambient sound such as noise, converts the speech and sound to electrical speech signals, and outputs the signals to the controller 1. The microphone 3 is provided to a position where speech of the user is easily collectable, such as to an upper surface of the steering column cover and to a sun visor on a driver's side.

The in-vehicle sensor group 4 includes various sensors that detect a status of the host vehicle, such as a vehicle speed sensor, acceleration sensor, gyro sensor, GNSS receiver, steering angle sensor, brake stroke sensor, accelerator pedal sensor, and turn-signal lever position sensor.

The vehicle speed sensor detects a travel speed of the host vehicle. The acceleration sensor detects an acceleration that acts on the host vehicle. The GNSS receiver receives waves from a satellite used in the GNSS (Global Navigation Satellite System) to acquire data of a current position of the GNSS receiver. The GNSS receiver can use a GPS receiver.

The gyro sensor detects a rotation angular velocity around the vertical axis of the host vehicle. The steering angle sensor detects a steering angle based on a rotation angle of the steering wheel. The brake stroke sensor detects a depression of the brake pedal. The accelerator pedal sensor detects a depression of the accelerator pedal. The turn-signal lever location sensor detects whether the turn signal lever is at a left-turn or right-turn position.

The in-vehicle sensor group 4 includes a seat sensor that measures a pressure added to each seat of the vehicle in addition to the above sensors. The data detected by the various sensors in the in-vehicle sensor group 4 is serially outputted to the controller 1.

The communication apparatus 5 includes a transceiver antenna to communicate with an external traffic information center (unshown) via communication networks such as telephone lines and the Internet. The traffic information center distributes congestion information indicating traffic congestion places and degrees of traffic congestion (congestion degrees) and weather information about an area where the host vehicle is traveling. The congestion degree is expressed by three steps: no congestion; slow traffic; and heavy traffic. The weather information includes conditions of weather (hereinafter, weather condition) such as fine, rain, cloudy, and snow and an ambient air temperature.

The communication apparatus 5 herein is realized by a communication module used in a known third generation mobile communication system, as one example. Additionally, the communication apparatus 5 can use various in-vehicle communication modules such as a DCM (Data Communication Module). The communication apparatus 5 may acquire a variety of information distributed by the traffic information center via road side units at intersections. The present application may use "information" not only as an uncountable noun but also as a countable noun.

The display 6 displays texts and images based on instructions from the controller 1 to report a variety of information to the user. The display 6 can display full colors and use a liquid crystal display, organic EL display, and plasma display. The display 6 in the present embodiment is a center display near the vehicle-width center of the instrument panel. The display 6 in another aspect may be a multi information display on an upper portion of the instrument panel on the driver's seat.

The audio output apparatus 7 includes a speaker, and converts the speech data inputted from the controller 1 to speech (including just sound) and outputs the speech.

The Map DB 8 stores map data by using a rewritable non-volatile storage medium such as a HDD (Hard Disk Drive). The storage medium to store map data in the Map DB 8 may be an optical storage medium such as a DVD in addition to the HDD. The storage medium may be nonrewritable. The map data includes road data indicating road connections (namely, road network).

The road data includes node data about points (nodes) where multiple roads intersect, merge, and branch and link data about roads (namely, links) connecting the points to each other. The node data includes a node ID that is a unique number of each node, a coordinate (latitude and longitude) of each node, node names, connection link IDs describing link IDs of all links connected to each node, and the presence of a traffic signal.

The link data includes various data such as a link ID that is a unique number of each road, a length of each road, a starting node and end node of each link, coordinate data of each point on each link, road types such as an expressway and a general road, road widths, link directions, road names, the number of lanes, and speed limits.

The memory 9 includes a rewritable non-volatile storage medium and an apparatus that reads and writes data from and onto the storage medium. The storage medium in the memory 9 can use a well-known storage medium such as a magnetic disc, an optical disc, and a flash memory. The storage medium in the memory 9 in the present embodiment includes, as one example, a removable storage medium such as an SD card. A DVD, CD, and HDD may be used as the storage medium.

The speech recognition DB 10 is a database to store data required for the well-known speech recognition. The speech recognition DB 10 stores, as the data required for the speech recognition, an acoustic model indicating an acoustic sound feature of a small unit (phoneme) of human speech sound, a recognition dictionary that associates an acoustic sound feature of phoneme with a word, and a language model that indicates correlations among words.

The controller 1 is also called a control circuit and includes, as one example, a general computer in the present embodiment. The controller 1 includes: a known CPU; non-volatile memory such as ROM, EEPROM, flash memory; volatile memory such as RAM; I/O; and bus line that connects the components to each other (none-shown). The non-volatile memory stores program modules and data to execute various processes.

Figure 2:
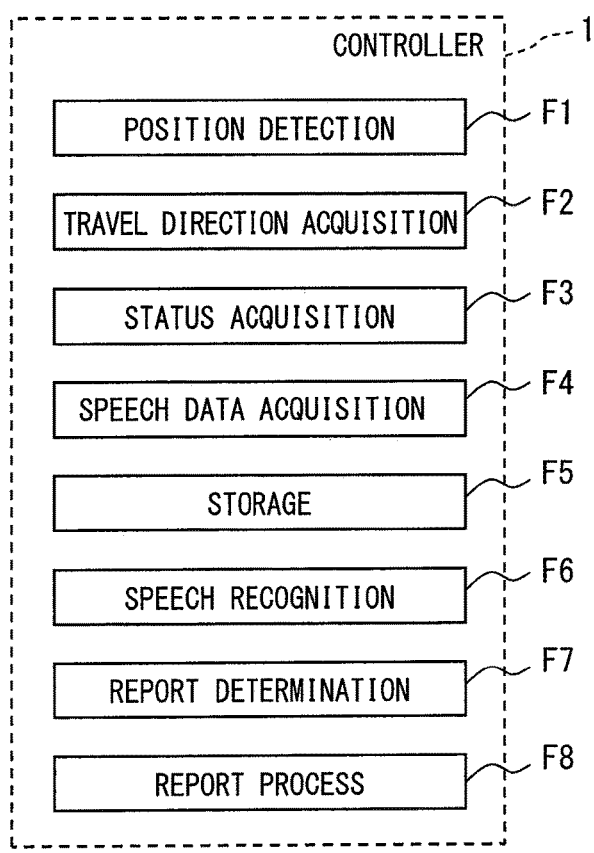
FIG. 2 is a block diagram illustrating an example of a schematic configuration of a controller of the first embodiment.

Functions realized when the controller 1 executes various program modules stored in the non-volatile memory are explained using FIG. 2. The controller 1 includes, as functional blocks as in FIG. 2, a position detector F1, travel-direction acquisition section F2, status acquisition section F3 (also called a status determination information acquisition section), speech data acquisition section F4, storage section F5 (also called a storage processor), speech recognition section F6 (also called a speech recognition processor), report determination section F7, and reporting processor F8. Part or all of the sections may be hardware components. The controller 1 is also called a reporting apparatus.

The position detector F1 detects a current position of the host vehicle based on signals inputted from the sensors in the in-vehicle sensor group 4 such as the GNSS receiver, vehicle speed sensor, and gyroscope. The positional information may indicate the current position as a latitude and longitude. The position detection section F1 acquires positional information serially (each 100 milliseconds).

Since the sensor group to detect the current position have different natures of errors, the multiple sensors complement each other. Output values of part of the above sensors may be used depending on an accuracy of each sensor. The position detection section F1 is also called a positional-information acquisition section.

The travel-direction acquisition section F2 detects a travel direction of the host vehicle based on signals inputted from the sensors of the in-vehicle sensor group 4, such as the gyroscope. For example, the travel direction may be values to 359 degrees clockwise with the north being zero degree.

The status acquisition section F3 acquires the above positional information and the information other than the travel direction (hereinafter, status determination information) from multiple types of information about the current host vehicle and statues around the host vehicle. The status determination information herein includes external information and travel condition information.

The external information indicates statuses external to the vehicle, such as time information, weather information, and congestion information about a currently traveled road (specifically, a link). The time information indicates a current clock time and a day of the week. The time information may also include a date. The weather information includes weather condition such as fine, rain, cloudy, and snow and an ambient air temperature. The external information does not include positional information.

The travel condition information indicates information on factors that may change in the vehicle at each travel. The travel used to define the travel condition information indicates a travel from the turn-on to turn-off of the ignition, that is, from when an occupant enters and starts the vehicle to when the occupant parks and gets off the vehicle. The travel condition information therefore signifies the information about the factors that do not change during travel, and does not include a travel direction that changes during travel.

The travel condition information includes a location where the ignition is turned on (starting point), a destination set by the user, and the number of occupants (also called an occupant count). The information may also include a route being traveled from the starting point, a route to be traveled to the destination, and a stop point set by the user.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device or module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer. Furthermore, the software section may be included in a software program, which may be contained in a non-transitory computer-readable storage media as a program product.

Figure 3:
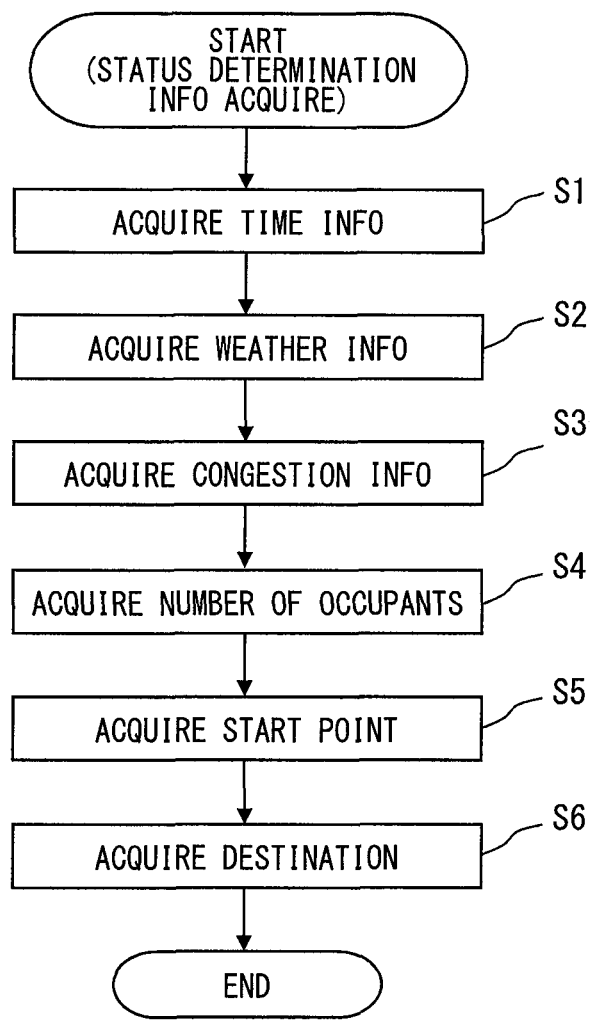
FIG. 3 is a flowchart illustrating an example of a sequence of a status determination information acquisition executed by a status acquisition section.

Processing to acquire status determination information (hereinafter, status determination information acquisition) executed by the status acquisition section F3 is explained using a flowchart in FIG. 3. The flowchart in FIG. 3 is executed serially (for example, each 100 millisecond) when the ignition of the host vehicle is turned on and power is being supplied to the controller 1, as one example. The sequence of the status determination information acquisition in FIG. 3 is one example. The order and contents of the processing may be appropriately designed.

A current time and a day of the week are acquired as time information at S1, and the processing proceeds to S2. The time information may be acquired from a clock in the host vehicle and from an outside source (such as the traffic information center) via the communication apparatus 5. The clock and the outside source may be used complementarily.

The time information may be managed by multiple time zones to which one day is divided. For example, the time zones may include a first time zone from zero to six o'clock, a second time zone from six to ten o'clock, a third time zone from ten to thirteen o'clock, a fourth time zone from thirteen to sixteen o'clock, a fifth time zone from sixteen to twenty o'clock, and a sixth time zone from twenty to twenty four o'clock. It may be determined which time zone speech data is acquired in. Then, the determined time zone may be stored as the time information.

At S2, a current air temperature and weather condition are acquired as the weather information, and the processing proceeds to S3. The current air temperature and weather condition may be acquired from the outside source via the communication apparatus 5. When the in-vehicle sensor group 4 includes an ambient temperature sensor that detects temperatures external to the vehicle, the temperature detected by the ambient temperature sensor may be used as an ambient temperature of the weather information. The current weather condition may be inputted by the user.

The congestion information about a currently traveled link is acquired at S3, and the processing proceeds to S4. As above, the congestion information is acquired from the traffic information center via the communication apparatus 5. As another aspect, the congestion degree of a currently traveled road may be determined and acquired from output values of the sensors of the in-vehicle sensor group 4.

An average travel speed during a predetermined time (five minutes) from the current time may be computed from time sequence data of output values of the vehicle speed sensor. The congestion degree may be then determined based on the average travel speed. In this case, when the average travel speed is a predetermined first threshold (for example, 15 km/h) or less, it is determined that heavy traffic occurs. When the average traveling speed is the predetermined first threshold (15 km/h) or more and a predetermined second threshold (25 km/h) or less, it is determined that slow traffic occurs. When the average travel speed is the predetermined second threshold or more, it is determined that no congestion is present. The thresholds for these determinations may be appropriately changed depending on whether a type of the road being traveled by the host vehicle is an expressway (including a motor highway) or a general highway such as a National highway and Prefectural highway.

The congestion degree may be determined from a frequency of depressions of the brake pedal within a predetermined time after the current time, a time ratio of the depressed state of the pedal, and a depression amount of the pedal. The congestion degree may be determined to be greater as the indicators are greater.

The number of occupants in the host vehicle is acquired at S4, and the processing proceeds to S5. The number of occupants is determined by counting the occupants seated in seats of the vehicle based on a pressure on each seat measured by the seat sensor. An IR sensor in the compartment may be also used for the detection.

The information about a starting point is acquired at S5, and the processing proceeds to S6. The information about the starting point may be expressed by a name of a point indicated by the positional information at the turn-on of the ignition. The name of the starting point is acquired from the registered-point data and map data registered by the user based on the positional information. For example, when the positional information at turn-on of the ignition is within a predetermined distance (for example, 100 m) from the point registered as a home, the starting point is determined as the home. The information about the starting point may be expressed by coordinates.

The information about the destination set by the user is acquired at S6 and the present sequence ends. The information about the destination is expressed by a name of the point set as a destination by a user's manipulation. The information about the destination may be expressed by coordinates of the point set as the destination. When no destination is set by the user, the destination information is set to NULL indicating an unset state.

Returning to FIG. 2, the functional blocks of the controller 1 are further explained. The speech data acquisition section F4 acquires speech data from a speech signal inputted from the microphone 3 based on an on signal from the talk SW 2.

Specifically, when receiving the on signal from the talk SW 2, the speech data acquisition section F4 enters a wait state to convert the speech signal inputted from the microphone 3 to speech data. The speech data acquisition section F4 converts the speech signal inputted from the microphone 3 to speech data during the wait state. When the state of no speech input continues for a predetermined time (for example, 1.5 seconds) after the start of the wait state, it is determined that speech input is finished to end the wait state. The user can input speech sound to the controller 1 when starting speech within the predetermined time after turning on the talk SW 2.

Whether the speech input is being made may be determined using a known art, i.e., by determining whether a signal level of a speech signal inputted from the microphone 3 is a predetermined threshold or more. That is, the speech signal of the level of the predetermined threshold or more being inputted allows the determination that the speech is inputted.

The storage section F5 associates the speech data acquired by the speech data acquisition section F4 with the status information when acquiring the speech data, and stores the associated data to the memory 9. The status information indicates the current status of the host vehicle or peripheral areas surrounding the host vehicle, including the positional information acquired by the position detection section F1, the travel direction acquired by the travel-direction acquisition section F2, and the status determination information acquired by the status acquisition section F3. The type of information used as the status information may be suitably set by the user and designer. The time of acquiring speech data may be a start point of input of a speech signal.

The storage section F5 lists and stores the speech data acquired by the speech data acquisition section F4. Each speech data of the list is associated with the status information when acquiring each speech data. Hereinafter, the data list having each speech data and the status information when acquiring each speech data as one set is hereinafter called a speech data list.

FIG. 4 illustrates an example of a data configuration of the speech data list stored in the memory 9. As in FIG. 4, each speech data is associated with a time, day of the week, air temperature, weather, traffic congestion degree, starting point, destination, and the number of occupants, and stored as the positional information, travel direction, and status determination information when acquiring each speech data.

For example, first speech data of No. 1 in the column of speech data is associated with a point P1. The travel direction of the host vehicle when storing the speech data is five degrees clockwise from the north. The time information indicates that the data is acquired at 8:05 on Monday. FIG. 4 illustrates time in 24-hour notation.

Further, the weather condition is rain and the ambient air temperature is 18 degrees Celsius when acquiring the first speech data. The traffic congestion degree is no congestion. The starting point is a home. The destination is a company. The number of occupants is one. The status may be on the way to work because the first speech data is inputted on the way to the company in the morning on a day of the week.

The second speech data of No. 2 in the column of speech data is inputted on the way to a facility A from the home Saturday morning. The number of occupants is four. The second speech data may be inputted during trip with family. As in the third speech data, the factors that indicate the status when the third speech data is inputted and that cannot be acquired, such as the congestion degree and destination, are given null indicating no acquisition.

As above, one example of the data configuration of the speech data list has been described. The data configuration of the speech data list may use another aspect. The speech data may be stored in association with the status information by a data configuration other than the list.

Returning to FIG. 2 again, the speech recognition section F6 executes a well-known speech recognition to the speech data stored in the memory 9 by using various data in the speech recognition DB 10, and generates text data corresponding to the speech data. The generated text data is delivered to the reporting processor F8.

The report determination section F7 accesses the memory 9 to search the speech data list for the speech data to be reported based on the positional information, travel direction, and status determination information that are newly acquired by the sections F1 to F3 respectively (namely, current status information). When the speech data to be reported is present, the location (address) in the memory 9 to store the speech data is delivered to the reporting processor F8, which then reports information in the speech data to the user.

It is determined whether to report the stored speech data by comparing the status indicated by the current status information and the status information associated with the speech data. The speech data to be reported signifies the speech data acquired in the status determined to be similar to the current status. The report determination section F7 is also called a similarity determination section.

As one example in the present embodiment, the report determination section F7 computes a degree of similarity (similarity) between the status indicated by the status information associated with the speech data and the status indicated by the current status information by comparing the status information to each other. When the similarity is a predetermined threshold or more, it is determined that the status when acquiring the speech data is similar to the current status. The speech data is thus determined to be reported. The condition to determine that the status in the status information associated with the speech data is similar to the status in the current status information is hereinafter called a similarity determination condition. The status indicated by the status information associated with the speech data is also called a status when acquiring speech data.

The similarity is computed to be greater as more factors in the status information associated with the speech data match, in respect of values or statuses, the factors in the current status information. The factors herein indicate types of minimum units of various information in the status information, such as a time, day of the week, and temperature. The determination condition to determine that a match is made in each factor may be appropriately designed, and is set as follows in the present embodiment as one example.

First, when the distance between the location when acquiring the speech data and the current position is within a predetermined distance (for example, 200 m), it is determined that a match is made in the factor of the positional information. When the difference between the travel directions is within a predetermined angle (for example, 20 degrees), it is determined that a match is made in the factor of the travel direction. When the difference between the times is within a predetermined time (for example, 30 minutes), it is determined that a match is made in the factor of the time. When the time is described as a time zone, it may be determined whether time zones match.

Days of the week are classified to weekdays from Monday to Friday and holidays from Saturday to Sunday. When the classifications match, it is determined that a match is made in the factor of a day of the week. For example, when today is Thursday (namely, weekday), it is determined that a match with the speech data acquired on one of Monday to Friday is made in the factor of a day of the week.

It is determined that a match is made in the factor of the temperature when the difference between the temperatures is within a predetermined temperature (for example, 4 degrees Celsius). It is determined whether matches with current values or statuses are made in the factors of weather, congestion degree, starting point, and the number of occupants. It is determined that a match is made in the factor of the destination when the distance to the current destination is within a predetermined distance (for example, 500 m).

The report determination section F7 computes the similarity in response to the number or ratio of the matching ones in the factors in the status information. In the present embodiment, the similarity is computed in response to the ratio of the matching ones in the factors in the status information. When matches are made in five ones in ten factors such as the point and the number of occupants, the similarity is 50 percent.

When the similarity is a predetermined threshold (for example, 90 percent) or more, the report determination section F7 determines that the status when acquiring the speech data is similar to the current status and that the speech data is to be reported. The factor of null may be considered to be in a match state. As another aspect, the factor of null may be considered not to be in a match state.

In this embodiment, weights of the factors contributing to the similarity are equal to compute the similarity, but this is not limiting. Each factor of the status information may be differently weighted to contribute to the similarity. For example, the factor of the positional information may be weighted greater than other factors. The similarity is greatly affected by whether a match is made in the factor of the positional information. This can reduce the possibility that it is determined that speech data is to be reported at other than the point where the speech data is acquired. The other factors may be weighted appropriately. The factor of a day of the week may be weighted less than that of time. The factor of temperature may be weighted less than that of weather.

The weighting may be set by the user in response to the contents of speech data. The speech recognition section F6 analyzes the contents of speech data, and based on words in the analyzed text data, the weighting may be automatically set.

The number and frequency of previous settings of possible values and statuses of the factor are evaluated, and in response to the frequency, the factor may be weighted. For example, as the previous frequency of a certain factor is a smaller value or status, the factor is weighted higher. Specifically, when the most frequently set value is one among the values stored as the number of occupants and the number of current occupants is four, the factor of the number of occupants is weighted higher than the other factors to compute the similarity. The higher weighting of the factor having an unusual value and status based on the evaluation of the number and frequency of the previous settings signifies the higher weighting of the factor of an unusual status, namely, the factor that features a current status. This can distinguish the statuses appropriately.

The reporting processor F8 acquires the speech data determined by the report determination section F7 to be reported (hereinafter called report speech data), and reports the information based on the report speech data to the user via the audio output apparatus 7 and display 6. Specifically, the reporting processor F8 outputs the report speech data as speech from the audio output apparatus 7.

The reporting processor F8 outputs the report speech data to the speech recognition section F6, and acquires text data corresponding to the report speech data. A text corresponding to the speech data is displayed on the display 6 (for example, as a popup) based on the corresponding text data. The reporting processor F8 may only report the information in the report speech data to the user, and may report the information by using only one of the audio output apparatus 7 and display 6.

Figure 5:
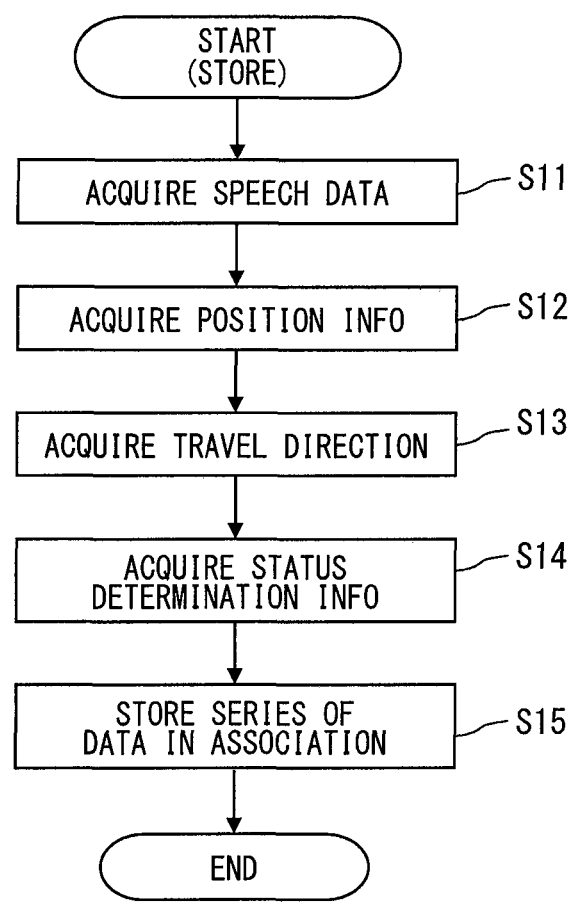
FIG. 5 is a flowchart illustrating an example of a sequence of storage related processing executed by the controller.

Here, a series of processes (hereinafter, storage related processing) executed by the controller 1 to store speech data is explained using a flowchart in FIG. 5. The flowchart in FIG. 5 starts when an on signal is inputted to the controller 1 from the talk SW 2, as one example. The sequence of the storage related processing in FIG. 5 is one example. The order and contents of the processing may be designed suitably.

The point of time of starting the speech data storage related processing is not limited to the above one. The speech data acquisition section F4 always acquires the speech data of the user via the microphone 3 in the on state of the ignition. The processing may start when a specific speech command (for example, "record") is inputted. The speech recognition section F6 may determine whether the speech data includes a specific speech command.

As another aspect, when the acceleration sensor or steering angle sensor of the in-vehicle sensor group 4 output a value of a threshold or more, the audio output apparatus 7 outputs a question "what's the matter?" The question may be outputted also when speech of the user is detected within a predetermined time after the audio output. The output of the sensor value of the threshold or more from the acceleration sensor or steering angle sensor signifies sudden acceleration or deceleration or sudden steering by the driver.

First, the speech data acquisition section F4 digitally converts the speech signal inputted from the microphone 3 to acquire speech data at S11, and the processing proceeds to S12. When speech data is generated from a speech signal, noise is removed by a well-known method.

The position detection section F1 detects positional information at S12, and the processing proceeds to S13. The travel-direction acquisition section F2 acquires a travel direction of the host vehicle at S13, and the processing proceeds to S14. The status acquisition section F3 acquires the status determination information at S14, and the processing proceeds to S15. At S15, the storage section F5 associates the speech data acquired at S11 with the positional information, travel direction, and status determination information and adds the associated speech data to the speech data list stored in the memory 9.

Figure 6:
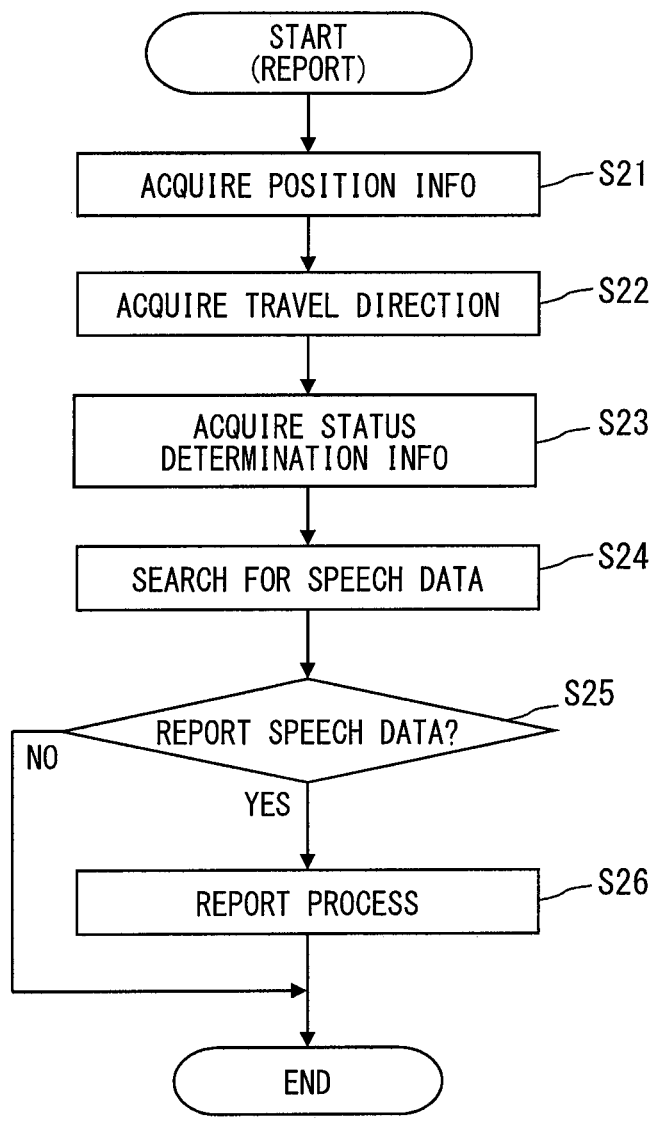
FIG. 6 is a flowchart illustrating an example of a sequence of report related processing executed by the controller.

Next, a series of processes executed by the controller 1 to report information based on speech data (hereinafter, report related processing) is explained using the flowchart in FIG. 6. The flowchart in FIG. 4 is executed serially (for example, every 100 milliseconds) when the ignition power of the host vehicle is turned on and power is being supplied to the controller 1. The sequence of the report related processing shown in FIG. 6 is one example, and the order and content of the processing may be designed suitably.

First, the position detection section F1 detects positional information at S21, and the processing proceeds to S22. The travel-direction acquisition section F2 acquires a travel direction of the host vehicle at S22, and the processing proceeds to S23. The status acquisition section F3 acquires status determination information at S23, and the processing proceeds to S24. The status information indicating a current status is acquired through S21 to S23.

At S24, the report determination section F7 accesses the memory 9, and searches the speech data list for the speech data to be reported based on the current status information. When the speech data to be reported is present, S25 is YES and the processing proceeds to S26. In this case, the location (address) in the memory 9 to store the speech data (namely, the report speech data) is delivered to the reporting processor F8. When the speech data to be reported is not present, S25 is NO and the processing ends.

At S26, the reporting processor F8 acquires the report speech data, and outputs the report speech data in speech from the audio output apparatus 7. The text corresponding to the speech in the report speech data is displayed on the display 6 as a popup. The present sequence ends after completion of S26.

Summary of First Embodiment

As above, the report determination section F7 computes the similarity of each of the speech data stored in the memory 9. When the similarity is a predetermined threshold or more, it is determined that the status when acquiring the speech data is similar to the current status. The reporting processor F8 reports, to the driver via the audio output apparatus 7 and display 6, the information based on the speech data whose status when acquired is determined by the report determination section F7 to be similar to the current status.

It is determined whether the status when acquiring the speech data is similar to the current status by using the status determination information in addition to the positional information and travel direction. The status determination information includes time information, weather information, a congestion degree, a starting point, a destination, and the number of occupants. For this reason, reporting is not made every time even at travel on the same road in the same travel direction. It can be therefore determined appropriately whether the information based on speech data, namely, speech input information is to be reported.

The threshold of the similarity to determine that the status when acquiring the speech data is similar to the present status may be designed appropriately, and may be 80 percent or 70 percent. The similarity may use the number of matching factors and a sum value of weights of the factors in addition to a percentage.

As above, the configuration and functions of the first embodiment has been explained, but the present disclosure is not limited to the above embodiment. The following modifications and embodiments are included in the technical scope of the present disclosure. In addition to the following, various modifications are possible without departing from the scope of the present disclosure.

First Modification

The first embodiment describes that the similarity is computed for each speech data stored in the memory 9 and the similarity determination condition uses a determination of whether the similarity is a predetermined threshold or more, but this is not limiting.

In the first modification, various factors in the status information include a factor (essential factor) that essentially needs the match between the status information when acquiring speech data and the current status information. The essential factor is set to each speech data as a similarity determination condition. When the similarity is high but when the essential factor does not match, it is determined that the statuses do not match.

The essential factor may be a factor that is included in the status information when acquiring speech data and that features a content of the speech data. For example, when a content of the speech data indicates a warning against rush-outs at a blind crossing, the factor that is included in the status information and that features the content of the speech data is positional information because the content of the speech data closely relates to the position of the crossing. That is, the essential factor to be set to the speech data in this case is the positional information. When the positional information is set as the essential factor, the similarity determination condition is that the positional informations match and the similarity is a predetermined threshold or more (for example, 80 percent).

As above, the positional information is used as the essential factor as an example. The essential factor may use time information and a day of the week (a weekday or not) when the content of the speech data indicates a warning against rush-outs of children around a school route. The essential factor may be set by the user. The speech recognition section F6 may analyze the content of the speech data to set the essential factor automatically.

As above, the same effect as the first embodiment is obtained, and by setting the factor that features the status when acquiring the speech data as the essential factor, it can be appropriately determined whether to report the speech data.

The match between the factor in the status information when acquiring speech data and the factor in the current status information is not limited to a perfect match as in the first embodiment, but indicates a state that satisfies a predetermined condition to determine that the factors match. The condition to determine that a match is made in each factor may be set appropriately by the user or designer. The factor to compute the similarity when setting an essential factor may be one that is in the factors in the status information and that is other than the essential factor.

Second Modification

The first embodiment and first modification use the similarity as the similarity determination condition, but this is not limiting. That is, the similarity determination condition may not use the similarity.

In the second modification, multiple essential factors are set to each speech data in response to a content of each speech data. When all values or statuses of information about the essential factors set to the speech data match those of the current status information corresponding to the essential factors, the report determination section F7 determines that the status when acquiring the speech data is similar to the current status and thus determines that the speech data is to be reported.

As in the first modification, the essential factors herein may be set by the user in response to the content of the speech data, and the speech recognition section F6 may analyze the content of the speech data to automatically set the essential factors. The essential factors include at least one of the factors in the status determination information.

The same effect as the first embodiment is thus obtained, and the following effect is also obtained. In the second modification, it can be determined whether the status when acquiring the speech data is similar to the current status by comparing the essential factors. The processing can be therefore made simpler than when all the factors are compared to compute the similarity. It can be determined whether to report the speech data appropriately by setting the essential factors.

Second Embodiment

Next, a second embodiment of the present disclosure is described using the drawings. For convenience, the components having the same functions as ones in the figures in the explanation of the first embodiment are given the same numerals, and not explained. When only part of the configuration is explained, the above first embodiment can be applied to the other part.

Figure 7:
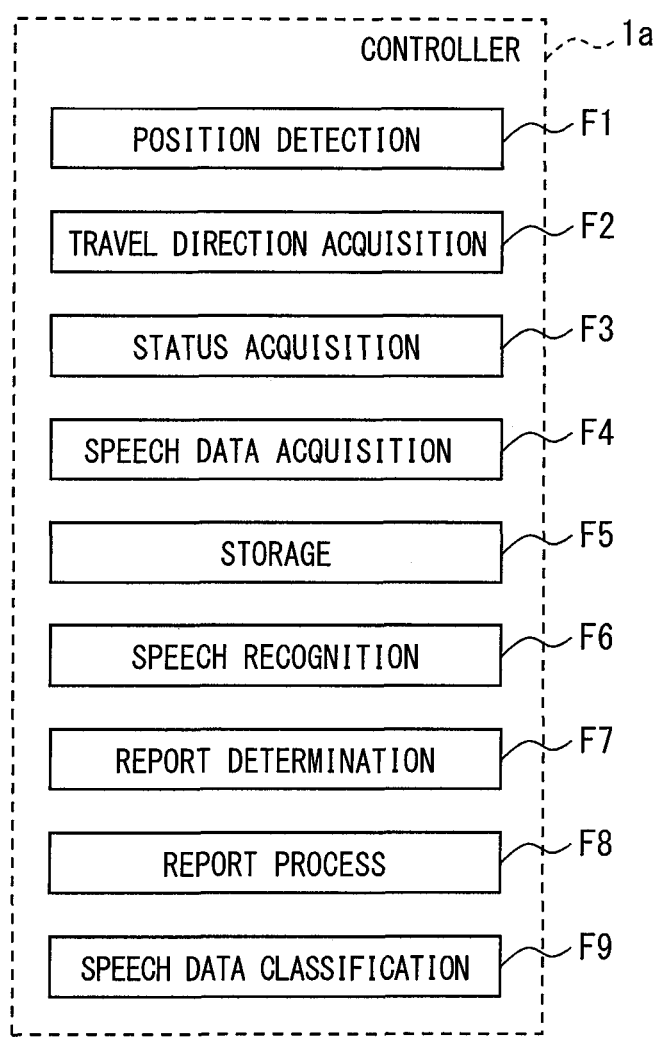
FIG. 7 is a block diagram illustrating an example of a schematic configuration of a controller in a second embodiment.

As in FIG. 7, a controller 1a in the second embodiment includes a speech data classification section F9 in addition to the functional sections F1 to F8 of the controller 1 of the first embodiment.

The speech data classification section F9 classifies speech data acquired by the speech data acquisition section F4 in response to a content of the data. The classification section F9 classifies the speech data into four classifications including a warning classification, congestion classification, suggestion classification, and memo classification, as one example herein. The warning classification is also called an alert classification. The suggestion classification is also called a destination suggestion classification.

The speech data classified into the warning classification includes warnings against rush-outs of pedestrians and bicycles, blind points, and bumps on roads, and is reported to the driver. The speech data classified to the congestion classification includes a road congested depending on time zones and a road that permits smooth travel, and is reported to the driver.

The speech data classified to the suggestion classification includes a facility that the driver wanted to visit or was interested in at a former travel, and is suggested to the driver. The speech data classified to the memo classification does not belong to the warning classification, congestion classification, or suggestion classification.

As above, the memory 9 stores a list of keywords to classify speech data in response to a content of the data. The speech data classification section F9 classifies speech data by using the keyword list.

Figure 8:
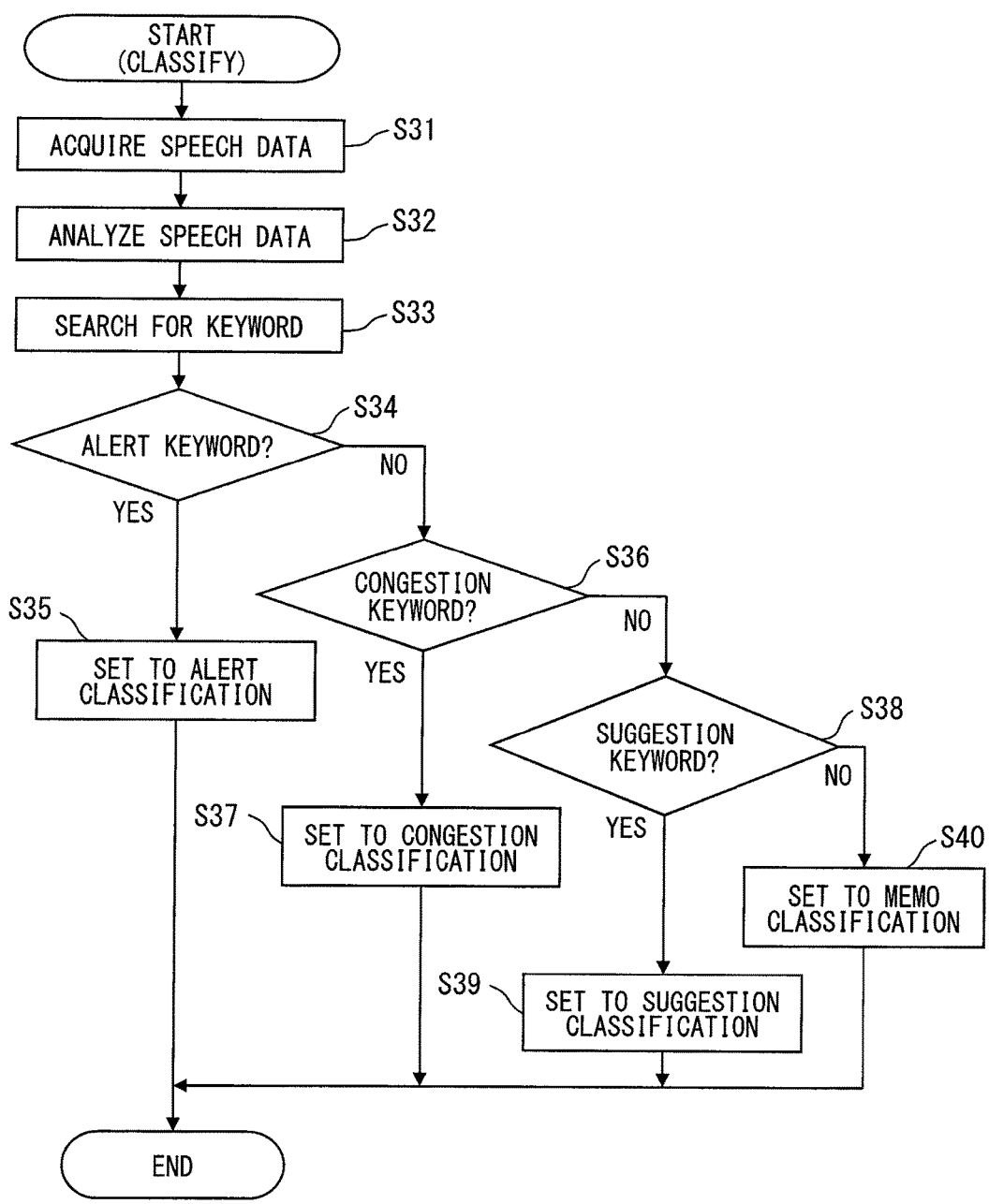
FIG. 8 is a flowchart illustrating an example of information classification related processing executed by the controller.

Here, a series of processes (hereinafter, classification related processing) executed by the controller 1 to classify the speech data in response to the contents of the data is explained using a flowchart in FIG. 8. The flowchart in FIG. 8 starts when an on signal is inputted from the talk SW 2 to the controller 1, as one example. The sequence of the classification related processing in FIG. 8 is one example, and the order and contents of the processing may be designed suitably.

First, at S31, the speech data acquisition section F4 digitally converts a speech signal inputted from the microphone 3 to acquire speech data, and delivers the speech data to the speech recognition section F6, and the processing proceeds to S32. At S32, the speech recognition section F6 executes speech recognition to the speech data acquired by the speech data acquisition section F4, and generates text data corresponding to the recognized speech data. The generated text data is delivered to the speech data classification section F9, and the processing proceeds to S33.

At S33, the speech data classification section F9 searches words in the text data generated at S32 for a keyword in the keyword list. First, at S34, it is determined whether the text data generated at S32 includes a warning keyword. When the text data includes the warning keyword, S34 indicates YES and the processing proceeds to S35. When the text data does not include the warning keyword, S34 indicates NO and the processing proceeds to S36.

The warning keyword is to set the speech data as the warning classification. The warning keywords include "blind," "dead angle," "rush-out," "dangerous," "attention," and "bump," for example. The method of searching text data for keywords may use a well-known art. At S35, the speech data acquired at S31 is set to the warning classification, and the present sequence ends.

At S36, it is determined whether the text data generated at S32 includes a traffic congestion keyword. When the text data includes a traffic congestion keyword, S36 indicates YES and the processing proceeds to S37. When the text data includes no traffic congestion keyword, S36 indicates NO and the processing proceeds to S38.

The traffic congestion keywords are ones to set the speech data to the congestion classification, and may include "crowded," "stuck," "heavy traffic," and "uncrowded." At S37, the speech data is set to the congestion classification, and the present sequence ends.

At S38, it is determined whether the text data generated at S32 includes a suggestion keyword. When the text data includes a suggestion keyword, S38 indicates YES and the processing proceeds to S39. When the text data includes no suggestion keyword, S38 indicates NO and the processing proceeds to S40.

The suggestion keywords are ones to set the speech data to the suggestion classification. The suggestion keywords may include "let's go to (a name of a facility)," "there is (a name of a facility)," and "next time."

At S39, the speech data is set to the suggestion classification, and the present sequence ends. At S40, the speech data is set to the memo classification, and the present sequence ends.

As above, the speech data classification section F9 classifies the speech data. The classifications set to the speech data by the classification section F9 are not limited to the above ones. The number of classifications and the procedure of classification may be designed suitably.

The storage section F5 in the second embodiment associates the speech data with the classifications set by the speech data classification section F9 and stores the associated data and classifications. FIG. 9 illustrates one example of the data configuration of the speech data list in the second embodiment. The first speech data in the speech data list in FIG. 9 is set to the congestion classification, and the second speech data is set to the warning classification. The third speech data is classified to the suggestion classification.

A difference between the second embodiment and first embodiment is that the reporting processor F8 changes a point of time to report the information based on speech data in response to a classification set to the speech data. To achieve the above difference, a configuration of the second embodiment is as follows as one example.

First, the report determination section F7 in the second embodiment changes a similarity determination condition in response to the classification set to speech data. In the present embodiment, as one example, when speech data is set to any one of the warning classification, congestion classification, and suggestion classification, essential factors are set in response to the set classification. When the status indicated by the information on the essential factors set to the speech data all match the status indicated by the information corresponding to the essential factors in the current status information, it is determined that the status when acquiring the speech data is similar to the current status.

For example, positional information and a time are set as essential factors for the speech data set to the warning classification, and a time zone, day of the week, starting point, and destination are set as essential factors for the speech data set to the congestion classification. The number of occupants, day of the week, starting point, and destination are set as essential factors for the speech data set to the suggestion classification.

When the speech data is set to any of the memo classification, the similarity is computed as in the first embodiment. When the similarity is a predetermined threshold or more, it is determined that the status when acquiring the speech data is similar to the current status.

As above, a point of time to satisfy the similarity determination condition changes in response to the classification set to the speech data.

Specifically, the speech data set to the warning classification satisfies the similarity determination condition at a travel around the location when inputting the speech data in the same time zone as inputting the speech data. The range defined in response to a distance within which the location when inputting the speech data is determined to match the current position is around the location when inputting the speech data, and is within 200 m from the location herein. The reporting processor F8 therefore reports the information based on the speech data set to the warning classification at the travel around the location when inputting the speech data in the same time as the input.

When the factors such as the current day of the week and time, starting point, and destination match the factors associated with the speech data set to the congestion classification, the similarity determination condition is satisfied.

That is, a point of time of satisfying the similarity determination condition is not a point of time of traveling the location when the speech data is actually inputted but a point of time when all the information about the essential factors becomes present after the ignition is turned on. The information about a time zone, day of the week, starting point, and destination is likely to be previously acquired at a start of travel.

The reporting processor F8 therefore reports the information based on the speech data set to the warning classification at a start of travel. The driver can thus consider a measure to select a route for avoidance of congested roads at a start of travel or by a predetermined distance or time of travel.

Further, when the factors such as the current number of occupants and day of the week, starting point, and destination match the factors associated with the speech data set to the suggestion classification, the similarity determination condition is satisfied. That is, a point of time of satisfying the similarity determination condition is not at travel on the location where the speech data is actually inputted but at a point of time when all the information about the essential factors becomes present after the ignition is turned on. It is assumed that the information such as the number of occupants, day of the week, starting point, and destination is present at a start of travel.

The reporting processor F8 therefore reports the information based on the speech data set to the suggestion classification at a start of travel. The driver can thus remember information such as a name of a facility to be visited during travel with the same number of occupants as before to determine whether to visit the facility at the current travel.

Summary of Second Embodiment

As above, the speech data classification section F9 classifies speech data in response to contents of the data. The reporting processor F8 reports the information based on the speech data at a point of time corresponding to the classification set to the speech data. For example, the information based on the speech data belonging to the warning classification is reported a predetermined distance before the location where the speech data is acquired. The information based on the speech data belonging to the suggestion classification or congestion classification is reported at a start of travel.

The speech data belonging to the warning classification has a relatively strong correlation with the location where the speech data is inputted. Even when the speech data is reported to the driver at a long distance from the location, the utility for the driver may be low. It is therefore preferable to report the information based on the speech data belonging to the warning classification at a close place to the location where the speech data is inputted.

When the speech data belonging to the congestion classification is reported to the driver at a close place to the location where the speech data is acquired, the host vehicle is likely to be caught in the similar traffic congestion to the one when the speech data is inputted at the execution of the reporting.

The information based on the speech data belonging to the congestion classification is therefore useful when reported before the approach to the location where the speech data is acquired, more preferably, at a point of time of permitting a change in a route.

The information based on the speech data belonging to the suggestion classification can be said to be more useful when reported at a start of travel than around the location when the speech data is acquired.

Therefore, the information in the speech data can be reported at an appropriate point of time by reporting the information based on the speech data at a point of time corresponding to the classification set to the speech data.

As above, the speech data classification section F9 automatically executes classification in response to the result of speech recognition, but this is not limiting. The classification may be executed based on user's manipulation.

The reporting processor F8 may change the procedure of reporting the information based on the speech data in response to the classification set to the speech data. Specifically, the audio output apparatus 7 outputs previously patterned speech corresponding to a content of speech data when the warning classification is set to the speech data. The information based on the speech data in the warning classification is displayed on a position relatively visible from the driver. The information based on the speech data in the other classifications may be displayed on a less visible position such as a center display. The position relatively visible from the driver may include a meter display and a head-up display.

Third Modification

In the second embodiment, by changing the similarity determination condition in response to the classification of the speech data, the reporting processor F8 changes a point of time of reporting the information based on the speech data, but this is not limiting. Apart from the similarity determination condition, a reporting condition may be set to each classification. The reporting processor F8 may not report the information based on the speech data satisfying the similar determination condition until the reporting condition is satisfied even when the similar determining condition is satisfied.

For example, the reporting condition is set to report when the host vehicle is at a predetermined distance (for example, 100 m) before passing through the location where the speech data in the warning classification is inputted. The condition to report at a start of travel may be set when the speech data is in the suggestion and congestion classifications. The information may be reported when the similarity is satisfied without the reporting condition when the speech data is in the memo classification. That is, the information may be reported at the similar status to the status when acquiring the speech data.

Also in this case, the reporting processor F8 reports the information based on the speech data at a different point of time in response to the classification of the speech data.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A reporting apparatus used in a vehicle, comprising:
   a positional-information acquisition section that acquires serially positional information of the vehicle as a factor to determine a status;
   a status acquisition section that acquires serially at least either external information indicating a status external to the vehicle or travel condition information about a factor likely to change in the vehicle at each travel, as status determination information;
   a speech data acquisition section that acquires speech as speech data each time a user speaks the speech;
   a storage section that, each time the speech data is acquired,
      associates the speech data with the positional information and the status determination information acquired at a time when the speech data is acquired by the speech data acquisition section, and
      stores the speech data, the positional information associated with the speech data, and the status determination information associated with the speech data, in a memory, as stored speech data, stored positional information, and stored status determination information;

a similarity determination section that determines with respect to each stored speech data in the memory whether a first status taking place at a time when the stored speech data is acquired is similar to a second status taking place at a current time,
the first status being indicated by the stored positional information associated with the stored speech data and the stored status determination information associated with the stored speech data,
the second status being indicated by the positional information newly acquired by the positional-information acquisition section at the current time and the status determination information newly acquired by the status acquisition section at the current time; and
a reporting processor that reports, to a driver, information based on the stored speech data in cases that the similarity determination section determines that the first status taking place at the time when the stored speech data is acquired is similar to the second status at the current time,
wherein
as the status determination information,
the status acquisition section acquires at least any one of weather information, congestion information, and a number of occupants,
the weather information and the congestion information each being a factor belonging to the external information, and
the number of occupants being a factor belonging to the travel condition information.

2. The reporting apparatus according to claim 1, wherein as the status determination information, the status acquisition section acquires at least the number of occupants.

3. The reporting apparatus according to claim 1, wherein as the status determination information, the status acquisition section acquires the at least any one of the weather information, the congestion information, and the number of occupants,
in addition to time information and route information,
the time information being a factor belonging to the external information,
the route information being a factor belonging to the travel condition information.

4. A reporting apparatus used in a vehicle, comprising:
a positional-information acquisition section that acquires serially positional information of the vehicle as a factor to determine a status;
a status acquisition section that acquires serially at least either external information indicating a status external to the vehicle or travel condition information about a factor likely to change in the vehicle at each travel, as status determination information;
a speech data acquisition section that acquires speech as speech data each time a user speaks the speech;
a storage section that, each time the speech data is acquired,
associates the speech data with the positional information and the status determination information acquired at a time when the speech data is acquired by the speech data acquisition section, and
stores the speech data, the positional information associated with the speech data, and the status determination information associated with the speech data, in a memory, as stored speech data, stored positional information, and stored status determination information;

a similarity determination section that determines with respect to each stored speech data in the memory whether a first status taking place at a time when the stored speech data is acquired is similar to a second status taking place at a current time,
the first status being indicated by the stored positional information associated with the stored speech data and the stored status determination information associated with the stored speech data,
the second status being indicated by the positional information newly acquired by the positional-information acquisition section at the current time and the status determination information newly acquired by the status acquisition section at the current time; and
a reporting processor that reports, to a driver, information based on the stored speech data in cases that the similarity determination section determines that the first status taking place at the time when the stored speech data is acquired is similar to the second status at the current time,
wherein
the similarity determination section
compares each factor in the status determination information newly acquired by the status acquisition section and the positional information acquired by the positional-information acquisition section with each factor in the stored status determination information stored in association with the stored speech data and the stored positional information stored in association with the stored speech data,
computes a similarity indicating a degree to which the second status at the current time is similar to the first status at the time when the stored speech data is acquired based on a number or ratio of matching factors in a plurality of factors indicating statuses at respective times and
determines that the second status at the current time is similar to the first status at the time when the stored speech data is acquired in cases that the similarity is a predetermined threshold or more.

5. A reporting apparatus used in a vehicle, comprising:
a positional-information acquisition section that acquires serially positional information of the vehicle as a factor to determine a status;
a status acquisition section that acquires serially at least either external information indicating a status external to the vehicle or travel condition information about a factor likely to change in the vehicle at each travel, as status determination information;
a speech data acquisition section that acquires speech as speech data each time a user speaks the speech;
a storage section that, each time the speech data is acquired,
associates the speech data with the positional information and the status determination information acquired at a time when the speech data is acquired by the speech data acquisition section, and
stores the speech data, the positional information associated with the speech data, and the status determination information associated with the speech data, in a memory, as stored speech data, stored positional information, and stored status determination information;
a similarity determination section that determines with respect to each stored speech data in the memory whether a first status taking place at a time when the stored speech data is acquired is similar to a second status taking place at a current time,
the first status being indicated by the stored positional information associated with the stored speech data and the stored status determination information associated with the stored speech data,
the second status being indicated by the positional information newly acquired by the positional-information acquisition section at the current time and the status determination information newly acquired by the status acquisition section at the current time; and
a reporting processor that reports, to a driver, information based on the stored speech data in cases that the similarity determination section determines that the first status taking place at the time when the stored speech data is acquired is similar to the second status at the current time,
wherein
the similarity determination section determines that the second status at the current time is similar to the first status at the time when the stored speech data is acquired in cases that a number or ratio of matching factors is a predetermined threshold or more between each factor in the status determination information acquired by the status acquisition section and each factor in the stored status determination information stored in association with the stored speech data and, simultaneously, in cases that a distance between the current positional information acquired by the positional-information acquisition section and the stored positional information stored in association with the stored speech data is within a predetermined distance.

6. A reporting apparatus used in a vehicle, comprising:
a positional-information acquisition section that acquires serially positional information of the vehicle as a factor to determine a status;
a status acquisition section that acquires serially at least either external information indicating a status external to the vehicle or travel condition information about a factor likely to change in the vehicle at each travel, as status determination information;
a speech data acquisition section that acquires speech as speech data each time a user speaks the speech;
a storage section that, each time the speech data is acquired,
associates the speech data with the positional information and the status determination information acquired at a time when the speech data is acquired by the speech data acquisition section, and
stores the speech data, the positional information associated with the speech data, and the status determination information associated with the speech data, in a memory, as stored speech data, stored positional information, and stored status determination information;
a similarity determination section that determines with respect to each stored speech data in the memory whether a first status taking place at a time when the stored speech data is acquired is similar to a second status taking place at a current time,
the first status being indicated by the stored positional information associated with the stored speech data and the stored status determination information associated with the stored speech data,
the second status being indicated by the positional information newly acquired by the positional-information acquisition section at the current time and the status determination information newly acquired by the status acquisition section at the current time; and
a reporting processor that reports, to a driver, information based on the stored speech data in cases that the similarity determination section determines that the first status taking place at the time when the stored speech data is acquired is similar to the second status at the current time,
wherein
the similarity determination section
sets, by each stored speech data, at least one factor that features the first status at the time when the stored speech data is acquired as an essential factor in factors in the stored status determination information stored in association with the stored speech data, and
determines that the second status at the current time is similar to the first status at the time when the stored speech data is acquired in cases that a factor corresponding to the essential factor in factors in the status determination information newly acquired by the status acquisition section matches the essential factor at the time when the stored speech data is acquired.

7. The reporting apparatus according to claim 6, further comprising
a speech data classification section that sets classification to the speech data acquired by the speech data acquisition section in response to a content of the speech data,
wherein the reporting processor changes a point of time to report information to the driver based on the stored speech data determined by the similarity determination section to be similar to the second status at the current time in response to the classification set to the speech data by the speech data classification section.

8. The reporting apparatus according to claim 7, wherein:
the speech data classification section includes at least an alert classification to alert the driver and a destination suggestion classification to suggest a destination to the driver; and
the reporting processor
executes reporting of the stored speech data to which the alert classification is set, when reaching within a predetermined distance from a position indicated by the stored positional information associated with the stored speech data, and
executes reporting of the stored speech data to which the destination suggestion classification is set when traveling by a predetermined distance or a predetermined time after a start.

9. The reporting apparatus according to claim 7, wherein
the similarity determination section changes a condition to determine that the second status at the current time is similar to the first status at the time when the stored speech data is acquired in response to the classification set to the speech data by the speech data classification section.

10. The reporting apparatus according to claim 7, further comprising:
a speech recognition section that analyzes a content of the speech data acquired by the speech data acquisition section to identify a word in the speech data,
wherein:
the memory stores a list of keywords to set classification to the speech data; and
the speech data classification section sets classification to the speech data based on the list and the word that is included in the speech data and is identified by the speech recognition section.

11. A reporting apparatus used in a vehicle, comprising:

a positional-information acquisition section that acquires serially positional information of the vehicle as a factor to determine a status;

a status acquisition section that acquires serially at least either external information indicating a status external to the vehicle or travel condition information about a factor likely to change in the vehicle at each travel, as status determination information;

a speech data acquisition section that acquires speech as speech data each time a user speaks the speech;

a storage section that, each time the speech data is acquired,
  associates the speech data with the positional information and the status determination information acquired at a time when the speech data is acquired by the speech data acquisition section, and
  stores the speech data, the positional information associated with the speech data, and the status determination information associated with the speech data, in a memory, as stored speech data, stored positional information, and stored status determination information;

a similarity determination section that determines with respect to each stored speech data in the memory whether a first status taking place at a time when the stored speech data is acquired is similar to a second status taking place at a current time,
  the first status being indicated by the stored positional information associated with the stored speech data and the stored status determination information associated with the stored speech data,
  the second status being indicated by the positional information newly acquired by the positional-information acquisition section at the current time and the status determination information newly acquired by the status acquisition section at the current time;

a reporting processor that reports, to a driver, information based on the stored speech data in cases that the similarity determination section determines that the first status taking place at the time when the stored speech data is acquired is similar to the second status at the current time; and a speech data classification section that sets classification to the speech data acquired by the speech data acquisition section in response to a content of the speech data, wherein:

the reporting processor changes a point of time to report information to the driver based on the stored speech data determined by the similarity determination section to be similar to the second status at the current time in response to the classification set to the speech data by the speech data classification section;

the speech data classification section includes at least an alert classification to alert the driver; and the reporting processor executes reporting of the stored speech data to which the alert classification is set, when reaching within a predetermined distance from a position indicated by the stored positional information associated with the stored speech data.

12. The reporting apparatus according to claim 11, wherein
  the speech data classified into the alert classification relates to a movement of a mobile object.

13. The reporting apparatus according to claim 12, wherein
  the speech data classified into the alert classification relates the movement of the mobile object including a pedestrian or a bicycle.

* * * * *